(12) United States Patent
Toth

(10) Patent No.: US 7,736,582 B2
(45) Date of Patent: Jun. 15, 2010

(54) METHOD FOR CONSOLIDATING TOUGH COATED HARD POWDERS

(75) Inventor: Richard Edmund Toth, N. Huntington, PA (US)

(73) Assignee: Allomet Corporation, N. Huntington, PA (US)

(*) Notice: Subject to any disclaimer, the term of this patent is extended or adjusted under 35 U.S.C. 154(b) by 1331 days.

(21) Appl. No.: 10/864,502

(22) Filed: Jun. 10, 2004

(65) Prior Publication Data
US 2005/0275143 A1    Dec. 15, 2005

(51) Int. Cl.
*B28B 3/00*    (2006.01)
(52) U.S. Cl. ........................ 264/642; 264/646
(58) Field of Classification Search ............. 264/642, 264/646
See application file for complete search history.

(56) References Cited

U.S. PATENT DOCUMENTS

| | | | |
|---|---|---|---|
| 2,370,242 A | 2/1945 | Hensel et al. | |
| 3,019,103 A | 1/1962 | Alexander et al. | |
| 4,183,746 A | 1/1980 | Pearce et al. | |
| 5,672,382 A | 9/1997 | Lux | |
| 5,682,595 A * | 10/1997 | Gonseth et al. | 428/552 |
| 5,773,735 A * | 6/1998 | Dubensky et al. | 75/240 |
| 6,372,346 B1 | 4/2002 | Toth | |

* cited by examiner

*Primary Examiner*—Steven P Griffin
*Assistant Examiner*—Russell J Kemmerle, III
(74) *Attorney, Agent, or Firm*—Finnengan, Henderson, Farabow, Garrett & Dunner, LLP

(57) ABSTRACT

A method of consolidating particulate materials into articles having combinations of properties not available by conventional processes by liquid phase sintering. These particulate materials are comprised of core particles individually coated with layers of a metal compound having a relatively higher fracture toughness than the core, such as WC or TaC. These coated particles include an outer layer comprised a metal, such as Co or Ni. The particles with these coatings are pressed to form an article and the article densified at pressures and temperatures where full density is achieved without the degradation of the material forming the core particle.

44 Claims, 7 Drawing Sheets

1000x SEM photo of 21 wt% Co test sintered above 1280°C eutectic showing targeted TCHP structure.

SEMs show WC rims only partly dissolved in Co and reprecipitated as submicron grains. Cobalt has not attacked the TiN surface (as it would in a conventional cermet structure).

FIGURE 6

WC-Co Solid and Liquid Phase Calculations

| Temp °C | Cobalt wt% overall | Solid WC wt% (vol%) | Liquid Phase wt% (vol%) |
|---|---|---|---|
| 1315 | 3  | 94.0 (91.8) | 6.0 (8.2) |
|      | 6  | 88.4 (84.5) | 11.6 (15.5) |
|      | 10 | 81.4 (75.7) | 18.6 (24.3) |
|      | 12 | 77.5 (71.0) | 22.5 (29.0) |
|      | 15 | 72.5 (65.2) | 27.5 (34.8) |
| 1400 | 3  | 93.7 (91.4) | 6.3 (8.6) |
|      | 6  | 88.0 (84.0) | 12.0 (16.0) |
|      | 10 | 80.6 (74.9) | 19.4 (25.1) |
|      | 12 | 76.4 (70.0) | 23.6 (30.0) |
|      | 15 | 71.1 (63.9) | 28.9 (36.1) |
| 1500 | 3  | 93.2 (91.0) | 6.8 (9.0) |
|      | 6  | 87.1 (83.2) | 12.9 (16.8) |
|      | 10 | 78.9 (73.3) | 21.1 (26.7) |
|      | 12 | 74.7 (68.4) | 25.3 (31.6) |
|      | 15 | 68.7 (61.6) | 31.3 (38.4) |
| 1550 | 3  | 92.9 (90.7) | 7.1 (9.3) |
|      | 6  | 86.3 (82.4) | 13.7 (17.6) |
|      | 10 | 77.8 (72.2) | 22.2 (27.8) |
|      | 12 | 73.4 (67.1) | 26.6 (32.9) |
|      | 15 | 67.3 (60.4) | 32.7 (39.6) |
| 1600 | 3  | 92.6 (90.2) | 7.6 (9.8) |
|      | 6  | 85.8 (82.0) | 14.2 (18.0) |
|      | 10 | 76.8 (71.4) | 23.2 (28.6) |
|      | 12 | 72.3 (66.3) | 27.7 (33.7) |
|      | 15 | 66.1 (59.5) | 33.9 (40.5) |
| 1700 | 3  | 92.0 (89.9) | 8.0 (10.1) |
|      | 6  | 84.2 (80.9) | 15.8 (19.6) |
|      | 10 | 74.6 (69.4) | 25.4 (30.6) |
|      | 12 | 69.3 (63.5) | 30.7 (36.5) |
|      | 15 | 62.5 (56.2) | 37.5 (43.8) |

METHOD FOR CONSOLIDATING TOUGH COATED HARD POWDERS

FIELD OF THE INVENTION

A method of consolidating Tough-Coated Hard Powders (TCHP) to essentially full density at low or no pressure, and articles consolidated using this method, is disclosed. The method is a cost-effective method of making sintered bodies of TCHP materials based on liquid phase sintering that provides increased value over conventional hard articles and tool materials known presently in the art.

BACKGROUND OF THE INVENTION

Sintering may be defined as the thermal treatment of a powder or compact for the purpose of bonding the particles together to create a solid article.

In certain applications where the powder is comprised of a mixture of powders of at least two distinct materials with different melting points, the powder mixture is compacted into a porous ("green") body. This body is heated above the melting point of the lowest melting constituent and a portion of the compacted loose powder mixture is liquified. After maintaining the body at the sintering temperature for a predetermined time, the material is allowed to cool and the liquid solidifies and "cements" the body into a densified useful structure. Examples of such systems are copper/tin, iron/copper, and tungsten carbide/cobalt.

In such processes, the densification of the compacted body takes place in the presence of a liquid phase, and such sintering processes are termed "liquid phase sintering" (LPS). In some systems, particularly the consolidation of "hard metals" such as tungsten carbide and other ceramic particles, LPS is sometimes called conventional sintering. In LPS processes it is beneficial to have a certain minimum amount of liquid phase present at sintering temperature to assure transport of the binder phase to accomplish uniform distribution and densification. It is also generally beneficial to restrict the amount of liquid phase present in order to avoid part shape deformation and grain growth.

This liquefaction enables, for instance, increased mass transport, particle rearrangement, development of a skeletal structure, and densification. It is generally thought that this is accomplished by rounding of the particles as the external irregularities are liquefied, and by the migration of this liquid to fill the voids. Upon cooling, recrystallization and often grain growth occur. Porosity, as a percentage of the whole volume, may decrease due to densification of the structure. The rate of densification may be influenced by, for example, sintering temperature, sintering time, sintering pressure, sintering atmosphere, and weight fraction of the binder constituent present.

Liquid phase sintering of conventional hardmetals such as tungsten carbide—cobalt (WC—Co) compacts is generally performed at sintering temperatures that range from 1325° C. to 1475° C.

As the WC—Co compact is heated during sintering of WC—Co hardmetals, the cobalt will start to behave like a very viscous liquid at about 700° C. and diffusion will increase with increasing temperature as Co viscosity correspondingly decreases. The grease-like behavior and viscosity of Co metal is believed to create capillary attractor forces resulting from the strong propensity of Co to wet as much WC surface as possible. This results in a rearrangement of WC particles and the composite begins to shrink even before the first liquid phase has formed.

At 1275° C., the Co binder metal begins to dissolve the WC particles and a ternary eutectic reaction begins to form a Co—W—C alloy. As temperature continues to increase, the increased surface wetting, liquefaction, and capillary forces cause continued particle rearrangement and shrinkage of the powder mass into the shape of desired articles as grain boundaries move through the interface between the WC grains and Co binder phase.

High density, uniformity, and WC stoichiometry in the sintered part are basic requirements for WC—Co microstructural integrity and strength. Ensuring proper local carbon balance during liquid phase sintering, which eliminates the formation of the brittle carbon-deficient $CO_3W_3C$ eta phase and carbon porosity caused by too much carbon is also important in providing the fracture toughness of WC—Co materials. Eliminating strength-robbing porosity and grain growth in the microstructure can be accomplished through selection of an appropriate sintering temperature and pressure. For example, the temperature must be high enough to liquefy an adequate amount of material to accomplish the mass transfer necessary to fill the pores between particles while maintaining the temperature low enough to avoid WC overdissolution that causes grain growth. To the extent that capillary forces are insufficient to provide densification to close to theoretical density, external pressure may be applied.

In conventional sintering, typically small percentages (3-18 wt %) of cobalt are mixed with WC. The cobalt binder plays a role in densification and its uniform distribution is desired in order to achieve uniformity in WC—Co microstructures. Microstructural defects are commonly found in sintered WC—Co parts. A general cause is inherently imperfect blending (even for long periods of time) of WC and Co powders that are of approximately equal diameters. It is desired that this process will encapsulate (or at least associate) each WC particle with just the right amount of Co such that the Co-to-WC ratio is essentially uniform throughout the mix. Statistically, it is highly unlikely that this result can be achieved because cobalt is not available in small enough nanoparticles to blend uniformly with the WC particles. Cobalt oxygenation, explosive pyrophoric reactions, and particle agglomeration are among the barriers to their availability.

The consequence is a WC—Co mixture with Co-rich and Co-poor areas. The liquid phase occurs first in the Co-rich zones, and the cobalt, unsaturated with WC, seeks thermodynamic equilibrium by (a) consuming nearby smaller WC crystals (the smallest ones may be totally consumed) and (b) by mobilizing unsaturated Co over long distances toward Co-poor zones to dissolve more and more WC until saturation is reached. Thus, a higher temperature than that necessary to create the liquid phase is needed to liquefy and transport the cobalt to Co-poor zones where it is required for equilibrium and for sufficient Co liquid to wet the WC particles.

Combating the effects of this uneven Co distribution is typically done using (a) very long ball-milling times, (b) higher sintering temperatures, and (c) longer sintering times. The ball milling tends to reduce many of the WC particles into fines, which are preferentially dissolved by Co during heating. The latter two measures do help spread the binder phase and normalize the distribution of the liquid Cobalt during sintering, but they also increase the dissolution of WC. In addition, some of the Co will penetrate the WC particles along their grain boundaries because of the WC/WC interface energy is higher (more positive) than the interface energy of WC/Co, at least as long as grain boundaries are present with interface angles nearly perpendicular to the surface. Upon cooling, the saturated WC—Co solution precipitates WC, preferentially nucleating and recrystallizing WC onto the adjacent remaining larger undissolved WC crystals, creating the undesirable Ostwald ripening (grain growth) phenomenon as solidification takes place. This grain growth proceeds until the temperature is decreased to below the 1275° C. ternary eutectic of the Co—W—C system. FIG. 1 shows the pseudobinary WC—Co phase diagram. Sintered densities of nearly 100% are commonplace for WC—Co materials.

Increasing sintering temperatures thus aids binder mobility but also causes excessive WC dissolution, resulting in unwanted grain growth. There is a tradeoff between sintering temperature and sintering time that must be carefully balanced. The maximum temperature must be high enough to liquefy enough material to accomplish the mass transfer necessary to fill the pores between particles (compromises structural strength) while trying to avoid too high a temperature for too long a time to avoid grain growth (which also reduces structural strength).

Since control of sintering temperature is one major aspect for high quality hardmetal microstructures, alternative sintering techniques have been employed. These techniques include the investigation of shortened sintering times (e.g. microwave sintering) and use of gas pressures (e.g. hot pressing, hot isostatic pressing [HiP], and the Ceracon and RocTec sinter-forging methods) to achieve consolidation at lower temperatures.

Another approach used in consolidating conventional hardmetals is to increase the weight fraction of the binder such as cobalt. This can be in the range of 18-25 wt %. This not only increases the amount of liquid present but can have the beneficial effect of increasing the toughness of the structure. However, this approach has two significant drawbacks and is therefore generally avoided. First, increasing the weight percent of binder diminishes the weight percent of WC (the wear-resistant phase) in the structure and diminishes wear resistance accordingly. Second, increasing the amount of binder also dissolves more WC, contributing significantly to grain growth during cooling.

Further, the only means to improve the wear resistance of conventional carbides (while retaining the high fracture toughness of the WC—Co substrate) for the past seventy years has been to (a) continuously refine and improve conventional powder and consolidation processing methods, (b) to add thin wear-resistant coatings, and (c) to laminate harder materials onto a WC—Co substrate. Improving conventional WC—Co microstructures is a delicate balance of time, temperature, grainsize, and other product and process parameters. Incremental improvements in conventional carbides have been achieved over the past fifty years through better sintering temperature control and the use of higher purity, highly uniform WC and Co starting powders. Since the introduction of external coatings over thirty years ago, improvements in wear resistance of materials with the toughness of WC—Co has been slowed almost to a halt.

While these techniques have reduced the problems that occur in liquid phase sintering of conventional hardmetals, there nevertheless remains an unmet need for a method of producing particles with properties that allow for uniform properties throughout the WC and binder powders upon sintering and articles formed from such particles.

To avoid the previously described drawbacks, the invention provides a method of consolidating by liquid phase sintering a new class of designed-microstructure particulate materials with unprecedented combinations of property extremes called Tough-Coated Hard Powders (TCHPs, or EternAloy®). This novel family of sintered particulate materials is comprised of one or more types of superhard Geldart Class C or larger ceramic or refractory alloy core particles having extreme wear resistance, lubricity, and other properties which are (1) individually coated with nanolayers of a metal compound having a relatively higher fracture toughness, such as WC or TaC, and (2) coated again with a second layer comprising a binder metal, such as Co or Ni. The combination of multiproperty alloys within the TCHP sintered structure allows the combination of normally conflicting performance extremes, including, but not limited to toughness, abrasiveness, chemical wear resistance, and light weight, at levels heretofore to provide materials with superior properties unavailable from the sintered homogeneous powders. TCHP materials are disclosed in U.S. Pat. No. 6,372,346 to Toth, which is incorporated by reference herein.

The process of the present invention allows the integration of thermodynamically incompatible material phases and property extremes in a single material. Thus, TCHP materials can be engineered to combine hardness approaching that of diamond with fracture toughness greater than that of tungsten carbide, and weight approximately that of titanium. As a result, TCHPs can significantly exceed the wear resistance of conventional metal cutting and forming tools; abrasives; friction and wear products and thermal coatings; and automotive, aerospace, heavy industrial, and defense components.

SUMMARY OF THE INVENTION

In view of the foregoing, there are provided methods of forming an article from particulate material. The method comprises providing a plurality of core particles comprised of one core particle material, or a plurality of different core particle materials chosen from metal and metalloid nitrides, metal and metalloid carbides, metal and metalloid carbonitrides, metal and metalloid borides, metal and metalloid oxides, metal and metalloid sulfides, metal and metalloid silicides, and diamond.

An intermediate layer is provided on a majority of the core particles. The intermediate layer comprises a second compound, different in composition from the core particle material and having a higher relative fracture toughness. The second compound is capable of bonding with the core particle material and capable of bonding with a metal chosen from iron, cobalt, nickel, copper, titanium, aluminum, magnesium, lithium, beryllium, silver, gold, platinum and their mixtures. The combination of the core particle and the intermediate layer forms coated particles.

An outer layer is applied to the coated particles. The outer layer comprises a metal chosen from iron, cobalt, nickel, and their mixtures and forms a substantially continuous outer layer on the intermediate layer. The combination of the coated particles and the outer layer forms component particles.

A plurality of the component particles are shaped into an article.

The article is sintered to substantially full density without significant external consolidation pressure at a temperature sufficient to liquefy at least a portion of the outer layer, and for a time sufficient to dissolve a portion of the intermediate layer in the liquid formed from the outer layer.

Liquids formed from the outer layer and the intermediate layer are solidified prior to significant detrimental interaction of the liquids with the core particles.

In one embodiment, the core particle material has the formula $M_aX_b$, where M is a metal chosen from titanium, zirconium, hafnium, vanadium, niobium, tantalum, chromium, molybdenum, tungsten, aluminum, magnesium, copper, and silicon; X is an element chosen from nitrogen, carbon, boron, sulfur, and oxygen; and a and b are numbers greater than zero up to and including fourteen.

In another embodiment, the core particle material is selected from TiN, TiCN, TiC, $TiB_2$, ZrC, ZrN, $ZrB_2$, HfC, HfN, $HfB_2$, $TaB_2$, VC, VN, cBN, hBN, $Al_2O_3$, $Si_3N_4$, $SiB_6$, SiAlCB, $B_4C$, $B_2O_3$, $W_2B_5$, $WB_2$, $WS_2$, AlN, $AlMgB_{14}$, $MoS_2$, $MoSi_2$, $Mo_2B_5$, and $MoB_2$.

Metalloid elements are those elements located along the line between the metals and nonmetals in the periodic table. Metalloids generally include boron, silicon, germanium, arsenic, antimony, and tellurium. Polonium is often considered a metalloid, too. Non-limiting examples of nitride metalloids are cubic boron nitride (cBN) and $Si_3N_4$. An example of a carbide metalloid is $B_4C$. An example of a bimetalloid compound is $SiB_6$.

Also disclosed herein is a method forming an article from particulate material that comprises providing a plurality of core particles comprised of one core particle material, or a plurality of different core particle materials, such as those selected from TiN, TiCN, TiC, $TiB_2$, ZrC, ZrN, $ZrB_2$, HfC, HfN, $HfB_2$, $TaB_2$, VC, VN, cBN, hBN, $Al_2O_3$, $Si_3N_4$, $SiB_6$, SiAlCB, $B_4C$, $B_2O_3$, $W_2B_5$, $WB_2$, $WS_2$, AlN, $AlMgB_{14}$, $MoS_2$, $MoSi_2$, $Mo_2B_5$, $MoB_2$, and diamond; and providing an intermediate layer on a majority of these core particles in an amount ranging from 10% to 80% by weight of the article. The intermediate layer generally comprises a second compound, different in composition from the core particle material and has a higher relative fracture toughness, wherein the second compound is selected from WC, TaC, $W_2C$, and a mixture of WC and $W_2C$, thereby forming coated particles.

The coated particles are typically treated as previously described, which includes applying an outer layer to the coated particles, the outer layer comprising a metal chosen from iron, cobalt, nickel, and their mixtures to form a substantially continuous outer layer on the intermediate layer, thereby forming component particles;

shaping a plurality of the component particles into an article;

sintering the article at a temperature sufficient to liquefy at least a portion of the outer layer, and for a time sufficient to dissolve from 5 to 90 volume % of the intermediate layer in the liquid formed from the outer layer to provide an effective amount of liquid to achieve substantially full density without significant external consolidation pressure, the solid portion of said intermediate layer preventing chemical interaction of the liquid with the core particles; and solidifying liquids formed from the outer layer and the intermediate layer prior to significant detrimental interaction of the liquids with the core particles.

The sintering temperature and time are such that they do not result in complete dissolution of the intermediate layer, but at most, lead to the dissolution of some part of the intermediate layer, such as 5-50% dissolution or 50-99% dissolution of the intermediate layer. Indeed, it is the solid portion of the intermediate layer that prevents chemical interaction of the liquid with said core particles.

BRIEF DESCRIPTION OF THE DRAWINGS

FIG. 6 is a table of calculated WC—Co solid and liquid phase compositions at various temperatures and cobalt contents.

DETAILED DESCRIPTION

Figure 1:
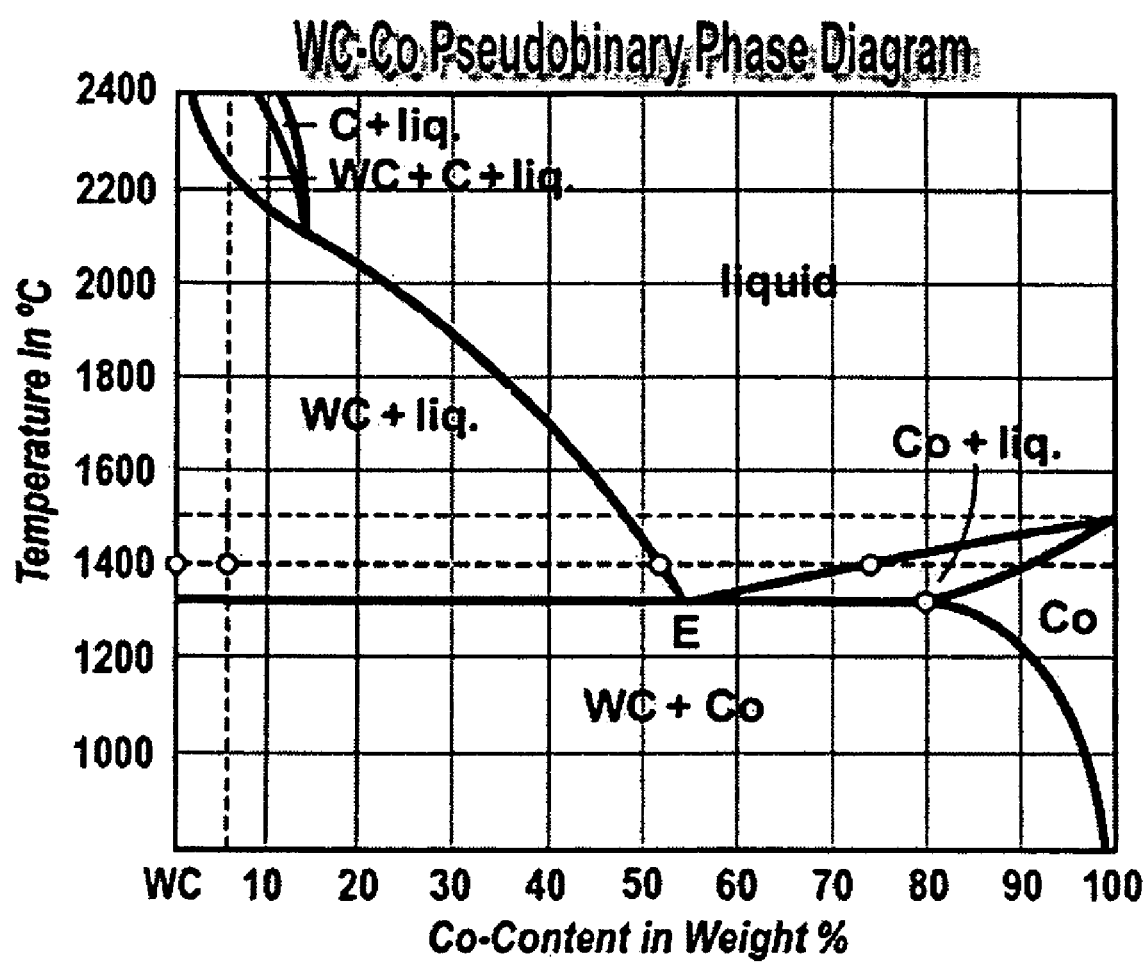
FIG. 1 is the pseudo-binary WC—Co phase diagram.

The present disclosure describes methods of encapsulating and sintering fine particles having desired sets of properties with grain boundary modifiers having other properties, thus allowing for the design of previously impossible material-property combinations. The TCHP "building block" particle contains elements, such as hardness+wear resistance+toughness+binder metal+other designer properties, and gives the materials engineer thousands of new material grades with engineered properties simultaneously optimized at the nano-, micro-, macro- and functional levels.

This merging of nanoencapsulation with the sintering of fine particles creates pseudoalloy structures integrating thermodynamically incompatible material phases and properties. Such integration allows these phases and properties to operate, for example, at working surfaces and edges of tools, as complex components, and as thermally-applied coatings. Combination of multiple properties, such as, for example, low weight, low coefficient of friction, high/low thermal conductivity, lubricity, and lubrication, is accomplished without the traditional limitations imposed by alloys, laminations, mechanical property enhancement, and heat treatment.

The methods described herein comprise the formation of an article from particulate material. For example, the particulate material, or TCHPs, comprises a plurality of core particles, an intermediate coating on a majority of the particles, and an outer coating on the particles.

In their powdered embodiments, the core particles can be a unique composite particulate material class that is comprised, for example, of one core particle material, or a plurality of different core particles materials chosen from metals or metalloids of nitrides, carbides, carbonitrides, borides, oxides, sulfides, and silicides, or diamond. The core particle materials is often a metal compound, having the formula $M_aX_b$, where M is chosen from at least one element chosen from titanium, zirconium, hafnium, vanadium, niobium, tantalum, chromium, molybdenum, tungsten, aluminum, magnesium, copper, boron, and silicon, while X is chosen from at least one element chosen from nitrogen, carbon, boron, sulfur, silicon, and oxygen.

The letters a and b in the formula $M_aX_b$ are numbers that range from greater than zero to fourteen. Non-limiting examples of such compounds include, TiN, TiCN, TiC, ZrC, ZrN, VC, VN, $Al_2O_3$, $Si_3N_4$, $SiB_6$, SiAlCB, $W_2B_5$, AlN, $AlMgB_{14}$, $MoS_2$, $MoSi_2$, $Mo_2B_5$, and $MO_2B$. In another embodiment, the plurality of core particles comprise at least one particle selected from diamond, cubic boron nitride, and hexagonal boron nitride, and their mixtures with each other or any of the above-described materials.

"Chosen from" or "selected from" as used herein refers to selection of individual components or the combination of two (or more) components. For example, X may comprise only one of nitrogen, carbon, boron, sulfur, silicon, and oxygen, or it may comprise a mixture of any or all of these components.

In other embodiments, a majority of the particles contain an intermediate layer comprising WC, $W_2C$, tool steel, glassy and devitrified nanosteel alloys, silicon nitride, or tantalum carbide. Such materials have a fracture toughness greater than that of cubic boron nitride. It is to be understood, however, that the material of the intermediate layer only need to have a higher relative fracture toughness than that of the material comprising the core particles, as well as being capable of bonding with the metal compound(s) or materials forming the core particles and is also capable of bonding with a metal chosen from iron, cobalt, nickel, copper, titanium, aluminum, magnesium, lithium, beryllium, silver, gold, and platinum.

In one non-limiting embodiment, the coated particles have an average particle size less than about 1000 microns. In another embodiment, the coated particles may have an average particle size of less than 100 microns, for example, less than about 50 microns, even less than 2 microns and, further, for example, of less than about 1 micron. In yet another embodiment, the coated particles may have an average particle size in the range of 100-1000 nanometers.

In another non-limiting embodiment, the intermediate layer may have a thickness, after sintering, in the range of from 5% to 50% of the diameter of the core particles. The thickness of the intermediate layer has an effect on the mechanical properties of the articles made therefrom. In one embodiment, when the coated particles (the core with an intermediate layer thereon) have an average particle diameter as measured graphically in a photomicrograph of a cross-section using the mean free path method of less than about 2 microns, the resistance to dislocation movement within adjacent sintered particles is enhanced, improving the mechanical properties of the sintered article. Even using a classic mechanical approach, using finite element analysis, it is apparent that increasing the thickness of a spherical shell WC surrounding a TiN sphere from about 0.1 micron to about 0.4 micron can increase the theoretical toughness over 40%. As the WC, TaC, $W_2C$, or WC and $W_2C$ coatings are decreased below from about 150 nanometers, it is believed that image stresses begin to progressively increase fracture toughness well above that predicted by a finite element analysis. As discussed by N. Louat, *Acta Metallurgica*, Vol. 33, No. 1, p. 59-69 (1985), "image stresses" are defined as intrinsic Newtonian resistance to microstructural dislocation glide.

Such an intermediate layer may be deposited by at least one method chosen from chemical vapor deposition, physical vapor deposition, plasma deposition, laser cladding or deposition process, plasma cladding, magnetic plasma deposition, electrochemical plating, electroless plating, sputtering, solid phase synthesis, solution chemistry deposition processes, and combinations of such processes.

In certain embodiments depending on the compound or compounds being deposited, the various precursors used for a given compound deposited, the layer deposition method used from the previous paragraph, the core particle chemistry, the intermediate layer thickness, and the desired properties of the coating, the intermediate layer is deposited at a temperature that may range from 20° C. to about 8000° C., such as, for example, from 20° C. to 125° C. In other embodiments, the intermediate layer is deposited at a temperature that may range from 125° C. to 1800° C., from 1800° C. to about 8000° C. and further, for example, from 200° C. to 800° C.

Additionally; in certain embodiments, the intermediate layer comprises a material selected from, for example, WC, TaC, $W_2C$, or WC and $W_2C$ in an amount that may range from, for example, 60% to 98% by weight of the article. In another embodiment, the intermediate layer comprises WC, TaC, $W_2C$, or WC and $W_2C$ in an amount that may range from, for example, 10% to 60% by weight of the article. In yet another embodiment, the intermediate layer comprises WC, TaC, $W_2C$, or WC and $W_2C$ in an amount that may range from, for example, 5% to 10% by weight of the article.

In certain embodiments, the majority of coated TCHP particles can then encapsulated by an outer binder layer that may, for example, be continuous. This layer may comprise cobalt, nickel, iron, their mixtures, their alloys, or their intermetallic compounds deposited on the outer surface of the second metal compound layer. The outer layer typically has a thickness after sintering in the range of from 3% to 12% of the diameter of the coated particles. Such outer layer may further comprise at least one layer chosen from other metals, or ceramic, binder, sintering aid, and polymeric material.

The outer layer may be deposited by at least one of the following methods: chemical vapor deposition, physical vapor deposition, plasma deposition, laser cladding or deposition process, plasma cladding, magnetic plasma deposition, electrochemical plating, electroless plating, sputtering, solid phase synthesis, or solution chemistry deposition process, and combinations thereof. In one embodiment of TCHP, the previously mentioned outer layer comprises at least one compound selected from metal, ceramic, binder, sintering aid, waxes, or polymeric materials. In the case of binders, sintering aids, waxes, or polymeric materials, coating may be accomplished by means of mixing or blending, with or without the addition of heat in the range of 50 to 150° C.

TCHP coating layers may be deposited throughout a wide range of temperatures, using many different processes, with CVD being the most common. The most common temperature range for CVD coating deposition is 200° C. to 800° C. However, much higher temperatures (1800° C. to about 8000° C.) are typical for processes such as plasma deposition, magnetic plasma deposition, pulsed laser deposition and electric arc discharge. Furthermore, much lower temperatures (20° C. to 200° C.) are typical for processes such as sol-gel solution chemistry, electrochemical and electroless depositions.

As with the intermediate layer, the various outer layer embodiments are deposited at different temperatures depending on the compound or compounds being deposited, the various precursors used for a given compound deposited, the layer deposition method used from the previous paragraph, the core particle chemistry, the intermediate layer thickness, and the desired properties of the coating, the outer layer may be deposited at temperatures ranging from 20° C. to 650° C. In one embodiment, the outer layer is deposited at a temperature ranging from, for example, 20° C. to 125° C. In another embodiment, the outer layer is deposited at a temperature ranging from, for example, 125° C. to 650° C. In another embodiment, the outer layer is deposited at a temperature that may range from, for example, 200° C. to 550° C.

As stated, the outer layer of the particle generally has a thickness after sintering in the range of from 3% to 12% of the diameter of the coated particles. The thickness of the outer layer may allow strain fields associated with dislocations in one coated particle to be transmitted through the outer binder layer to the immediately adjacent intermediate layer.

In one embodiment, the outer layer comprises an amount, for example, up to 45% by weight of the article and further, for example, from about 0.5% to 3.0% by weight of the article. In another embodiment, the outer layer comprises an amount ranging from greater than 3.0% to 18% by weight of the article, and in yet another the outer layer comprises an amount ranging from greater than 18% to 45% by weight of the article.

The combination of the core particles, intermediate layer, and outer layer may form a coated particle, having an average particle size of, for example, less than about 1 micron.

By using the above-described powders, a sintered TCHP embodiment comprising a plurality of sintered TCHP coated composite particle variants having a plurality of core particle compounds or elements as described above can be engineered to simultaneously reside in a common contiguous microstructure of high fracture toughness comprised of the particle intermediate coatings and binder layers. It is these combinations and permutations of over 30 different core particle compounds and elements that gives the TCHP family such a profound diversity of property variance each with unique property combinations.

Generally, TCHPs are fabricated for eventual consolidatation into or clad onto articles. Consolidated TCHP articles are designed for numerous applications, such as those demanding both extreme wear resistance and high toughness. In their consolidated embodiments, TCHPs are a unique material class essentially comprised of plural composite TCHP coated particles sintered into a unified whole. In certain embodiments, the TCHP-coated particles are sintered into articles utilizing liquid phase sintering. In one embodiment, the articles are liquid phase sintered utilizing cobalt as the binder phase. In other embodiments, nickel or iron or alloys of cobalt, nickel, and iron bay be used as binders. Consolidation during this sintering process may occur primarily from capillary forces.

Liquid phase sintering of TCHPs may be facilitated by several factors. One factor is a substantially uniform distribution of the material comprising the outer layer throughout the powder. For purposes of describing the distribution of this material, "uniform" means that the outer layer on the surface of the intermediate layer of the particles is such that the material of the outer layer is evenly distributed throughout the body of the unsintered compacted powder. This may be achieved, in certain embodiments, by adding cobalt (or other material comprising the outer layer on the particle) atom-by-atom during coating, to encapsulate the surface of the highly contiguously WC-coated TCHP particle with the targeted Co:WC ratio. This continues until the desired Co:WC ratio is uniformly distributed on the TCHP particles and throughout the powder. This feature of TCHP allows the conditions to be adapted to suit many different targeted TCHP compositions, such as, for example, by (a) protecting the core particles from dissolution by the binder and (b) providing a contiguous tough support structure. The result is higher sintering temperatures than those used for conventional WC—Co materials, while reducing the requirement for high external pressure, without risking WC grain growth and loss of strength. More uniform Co distribution also results in far better microstructural consistency and a homogeneous distribution of wear-resistant phase core particles. This resulting TCHP homogeneous microstructure has superior microstructural integrity. This leads to fewer structural defects and further translates into better, more consistent material properties, with a concomitant increase in performance.

In certain embodiments, sintering may occur at conditions, such as temperature, and/or consolidation pressure, for a time sufficient to obtain a liquid phase in the outer layer, the intermediate layer, or both in an amount up to, for example, 99.5%, such as 70% by volume of the layers, not including the core particle volume and further, for example, up to 45% by volume of the layers, not including the core particle volume.

In certain embodiments, sintering temperatures may range, for example, from 600° C. to about 8000° C. In one embodiment, the sintering temperature may range from 600° C. to 1700° C., such as, for example, from 1250° C. to 1700° C. In another embodiment, the sintering temperature may range, for example, from 1700° C. to about 8000° C.

In one non-limiting embodiment, the sintering temperature may range, for example, from 600° C. to 1700° C. and the amount of the liquid phase may range, for example, from 6 to 44% by volume of the layers, not including the core particle volume.

Generally, TCHP consolidation takes place at some pressure higher than absolute zero pressure, such as in the range from zero absolute pressure to atmospheric pressure.

Typically "vacuum" sintering pressures take place in the range of 1-760 torr (760 torr=1 atmosphere), and this is commonly referred to as "pressureless" sintering. In this instance, the use of lower-than-atmospheric pressure is generally for two purposes: control of chemical reaction rates and control of physical processes during the various temperature ranges employed during the sintering process. The gases may include but are not limited to nitrogen, argon, helium, hydrogen, neon, krypton, xenon, methane, acetylene, carbon monoxide, carbon dioxide, and their mixtures and related compounds.

It is to be understood that "pressureless" sintering only refers to the sintering or consolidation at sintering temperatures, not the forming of pre-fired (or "green") articles during cold or warm compacting processes, such as cold isostatic pressing (CIP). During compacting procedures, external consolidation pressure is generally applied in an amount sufficient to form a "green" article. It would be clear to one of ordinary skill in the art that sintering does not occur during warm or cold compacting processes.

Binders typically used to add green strength to articles formed from the TCHP described herein, include, but are not limited to, paraffin waxes, stearic acid, ethylene bis-stearamide (EBS), plasticizers (such as polyvinyl alcohol, polyethylene glycol, or synthetic resins), and similar related organic compounds.

Certain TCHP core powders, such as nitrides, including but not limited to TiN, ZrN, and HfN, react to high sintering temperatures by off-gassing nitrogen. The liberation of $N_2$ frees Ti atoms, which can deplete the WC coating of carbon, creating an, off-stoichiometric condition that is harmful to TCHP mechanical properties. Examples of chemical TCHP reactions that can be prevented or promoted through use of lower-than-atmospheric pressures include oxidation and reduction reactions (such as decarburization, deoxidation, denitrification, offgassing, or chemical decomposition of various constituents in the core powder or coatings). Control of these oxidation and reduction reactions is desired for consistency in sintered parts and for stabilizing processes that further aid in densification.

Some TCHP core particles are very irregularly shaped and may require the addition of lubricants to aid in their consolidation since they are not rounded off by dissolution. In addition, the thin WC and Co TCHP coatings require protection from airborne oxygen and moisture, and this may require an additional polymeric protective coating. Examples of physical TCHP processes that can be controlled through use of lower-than-atmospheric pressures include transport of polymeric materials (e.g. debinding or delubing rates), volatilization rates, heat transfer rates, and possible thermal decomposition of constituent materials.

Polymeric materials are used in these TCHP applications as fugitive binders and lubricants, for protective encapsulation, and for shelf-life enhancement, for example, include those previously mentioned, e.g., paraffin waxes, stearic acid, ethylene bis-stearamide (EBS), plasticizers (such as polyvinyl alcohol, polyethylene glycol, or synthetic resins), and similar related organic compounds.

Pressures below atmospheric pressure are typically not used for consolidation purposes. One purpose of absolute pressures above atmospheric is to consolidate the PM part. However, gas pressures above atmospheric may also address control of the chemical reactions listed above.

It is understood that the volume of the liquid phase in the outer layer or the intermediate layer may be increased by increasing at least one parameter chosen, for example, from the sintering temperature, the sintering pressure, and the binder material content. A non-limiting example of the binder material is cobalt.

The very uniform distribution of Co, both locally and throughout the entire TCHP body, reduces the requirement for high external pressure by permitting an increase in the sintering temperature up to that needed above the 1275° C. eutectic point to obtain the amount of liquid phase necessary for mass transport and TCHP densification.

In sintering TCHP, even at sub-eutectic temperatures, the wetting angle of the cobalt layer on the WC coating may, for example, be small and, further, for example, may be zero. In one embodiment, the cobalt in TCHP, coated directly on the WC layers, need only travel extremely short distances to wet and cover the WC coatings. During heating of TCHP, the outer layers of atoms in each WC layer first diffuse and then dissolve into the outer Co layer. The WC layer is uniformly dissolved from the outside inwards. In TCHP, these layers achieve thermodynamic equilibrium and liquid phase with greatly reduced cobalt mobility needed.

Figure 3:
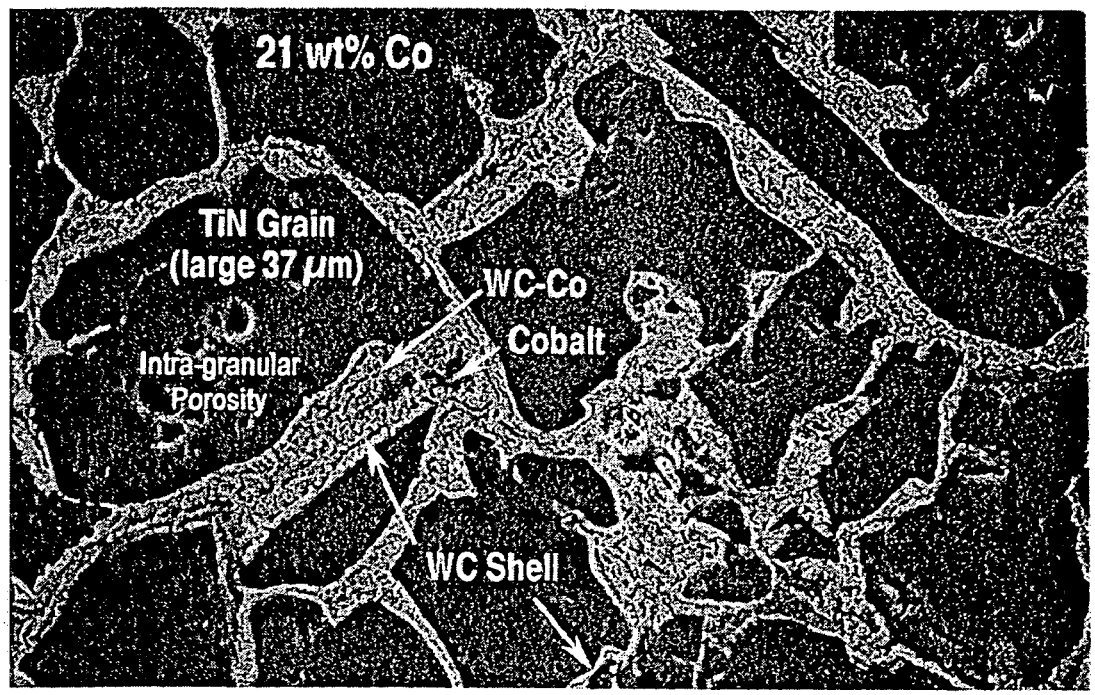
FIG. 3 is an SEM photograph showing that the TCHP structure is intact even when excessive Co is included.
Figure 4:
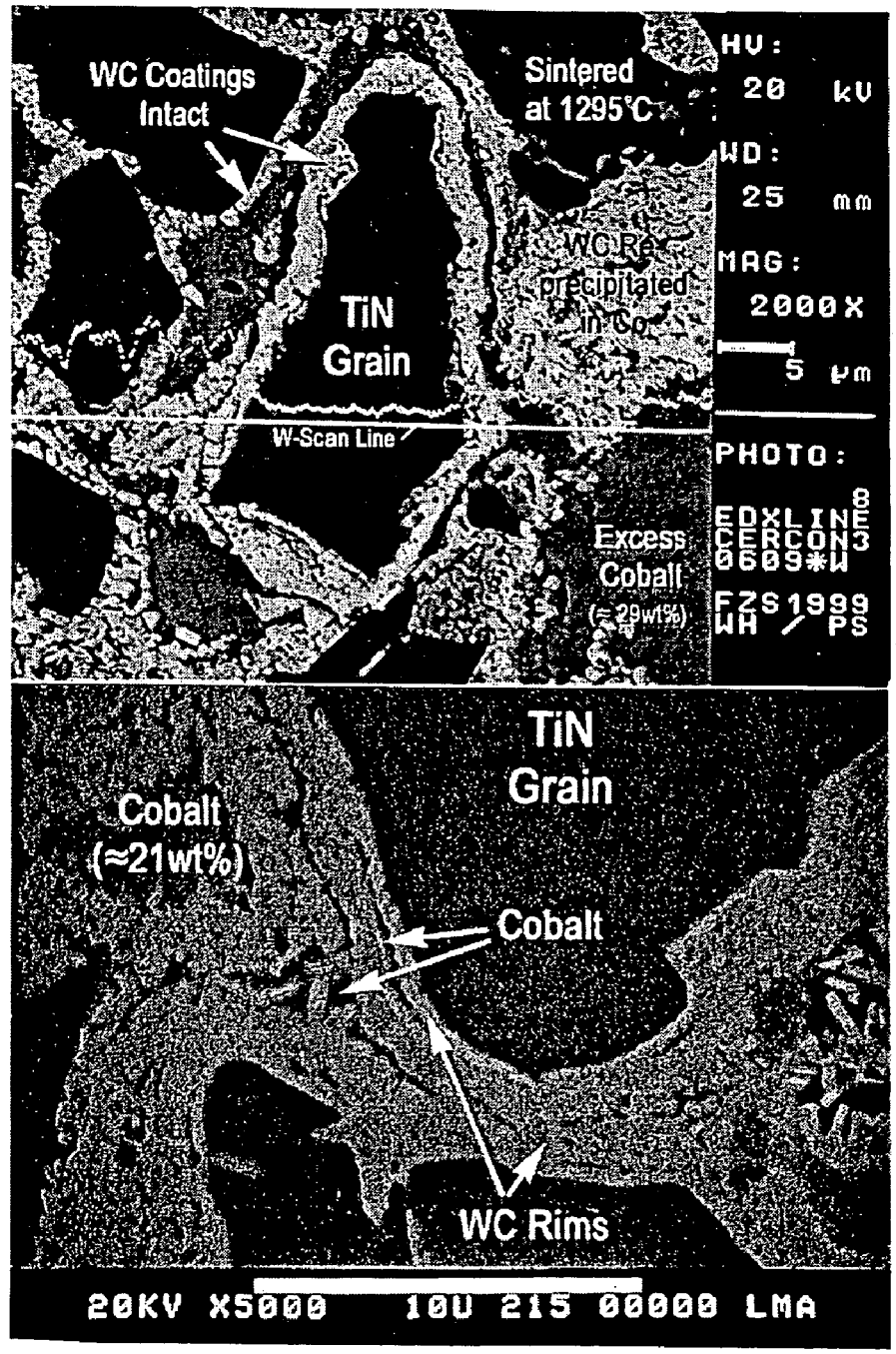
FIG. 4 is an SEM photograph showing effective prevention of WC layer dissolution during and after sintering.

In certain embodiments, cobalt does not penetrate the coatings to the core particle. For example, a highly contiguous $WC_{(1-x)}$ coating surface structure typical of the contiguity of CVD coatings on tool inserts and other articles may be present. The CVD-deposited $WC_{(1-x)}$ polycrystals at deposition temperatures can be up to two orders of magnitude smaller and more tightly packed than those found in conventional milled WC—Co particles. During carburization of the $WC_{(1-x)}$ coating to stoichiometry, there is grain growth within the coating polycrystals (depending on carburization temperature). However, the intimate proximity of cobalt to these polycrystals is such that the coating polycrystals will be dissolved uniformly around the WC coating and the equilibrium may limit grain growth. In FIGS. 3 and 4, it can be seen in the WC coating structures after sintering that the polycrystals may be one order of magnitude smaller than conventional milled WC—Co polycrystals. In another embodiment, grain growth up to about 1 micron may occur in zones where significant Co-pooling occurs.

Figure 5:
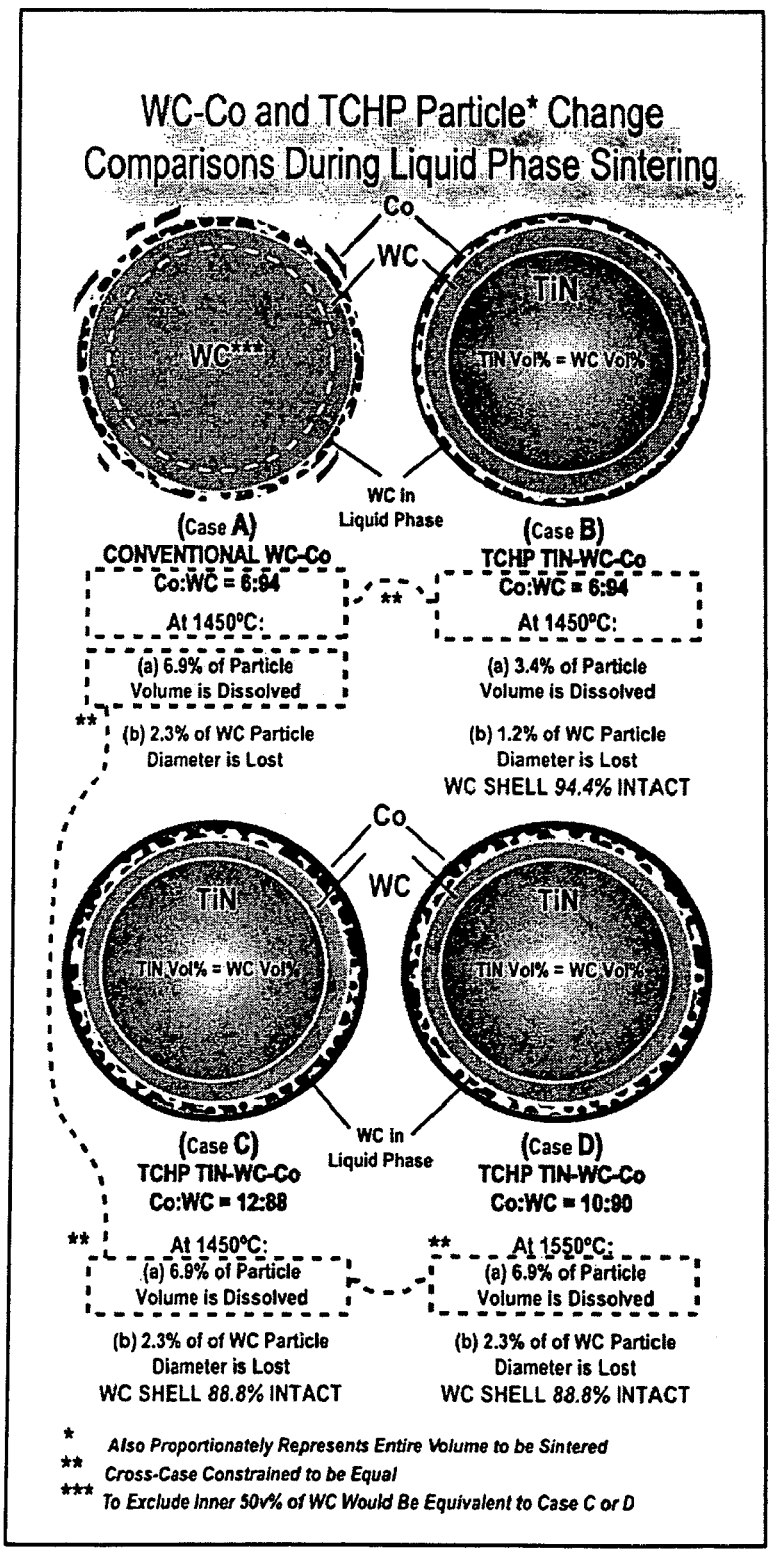
FIG. 5 represents a model of different TCHP materials at various sintering temperatures. This compares particle dissolution under various liquid phase sintering conditions.
Figure 7:
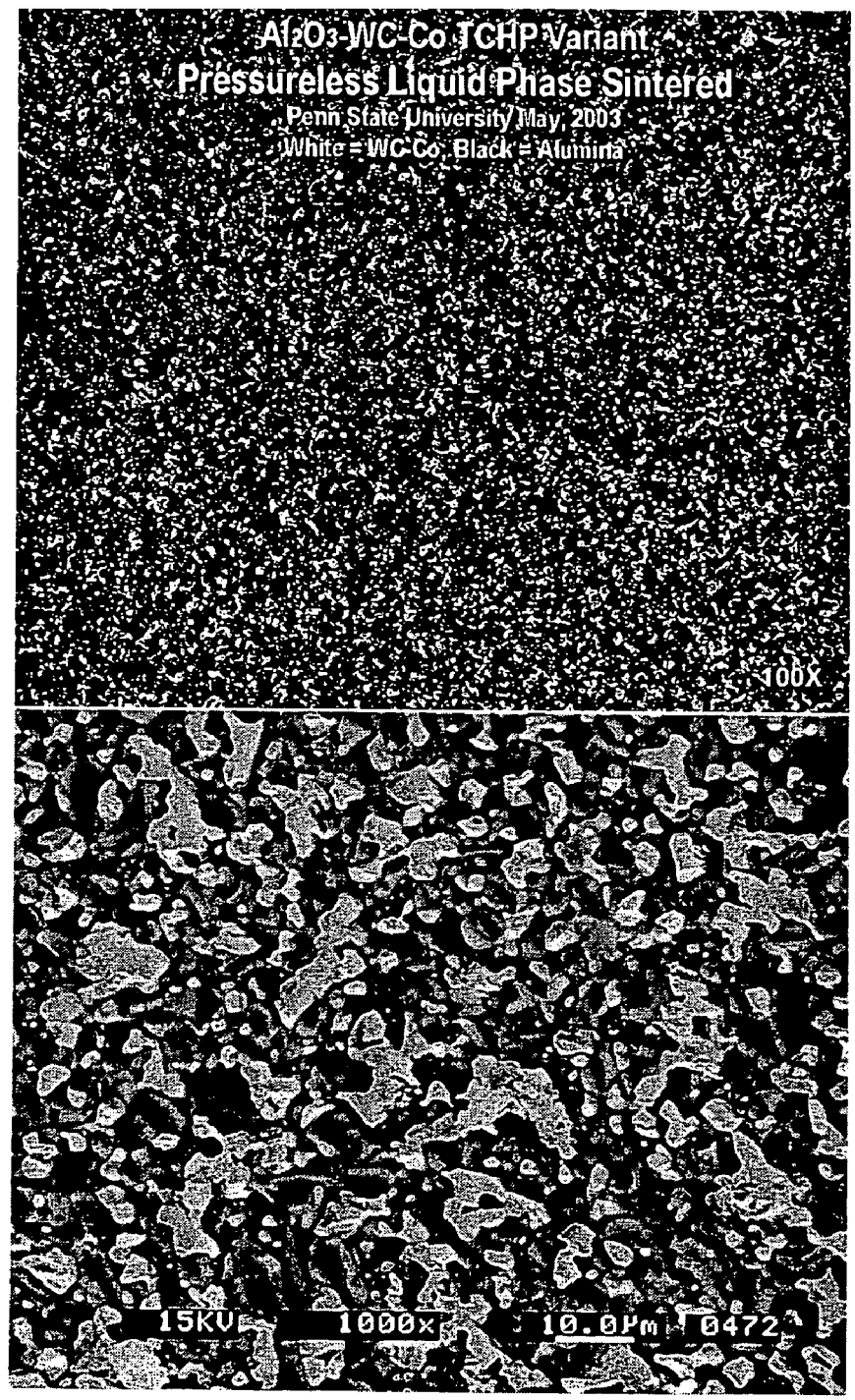
FIG. 7 are microstructural photographs of liquid phase sintered TCHP.

The imperviousness of the TCHP WC coatings to Co attack may be due at least partly to the following explanation. It is axiomatic that the WC and Co in TCHP will behave chemically essentially like the WC and Co in conventional hardmetal blends. By evaluating the WC—Co phase diagram (see FIG. 5), it can be determined (see FIG. 6) that while sintering a typical TCHP target matrix consisting of 50v % of the particle (75 wt %) WC coating with a coating composition of 94 wt % WC–6 wt % Co at 1500° C., 87.1 wt % of the WC coating (or 92.7% of the original 50 v % WC coating) remains as protective solid WC in the TCHP coating on the TCHP core particles. Since the WC coating dissolves from the outside in, the remaining solid WC can only be present as the targeted core-protective and structural coating.

As the cobalt softens and approaches liquid phase, some particle rearrangement would be expected, but rearrangement alone will be insufficient to provide full densification, so additional WC must be liquefied. Densification can be obtained even with very low volumes of liquid phase. Since the liquid phase Co is uniformly distributed in TCHP, almost completely along all WC surfaces, without pooling or gradients, a very low volume of liquid Co binder may at provide a major part of liquid phase sintering. It is believed that dissolution of WC must provide the remaining part of the liquid phase sintering.

As stated, the WC coatings of TCHP particles generally dissolve from the outside in leaving an undissolved protective and structural layer around the core particles, and re-precipitate and nucleate to reinforce the existing particle coatings or as kinetically-transported pore and interstitial filler material. As used herein "interstitial filler" means a material that fills the interstices (small spaces) between adjacent particles. Only partial dissolution of the WC coating layer in the Co binder is necessary for densification, WC re-precipitation/recrystallization, and creation of contiguous TCHP microstructural matrix integrity. The only Co and WC mobility required is that needed to transport material to fill the diminishing nearby interstitices between coated core particles.

In theory, there are at least three avenues for increasing the dissolution of a solute in a solvent: (1) increasing the amount of solvent present (in one embodiment the Co:WC wt % ratio), (2) increasing the temperature of the solvent and solute, and (3) reducing the pressure on the solvent and solute. In reality, there are only two avenues to increasing the amount of liquid phase present during sintering TCHPs. The first two avenues are discussed.

A certain number of core particles, for example, a transition metal carbides and nitrides, will interact chemically with cobalt, nickel and other binders. These core particles are referred to as the "soluble core" group particles. With respect to increasing the temperature, even if the TCHP sintering temperature were to be considerably increased to an amount sufficient to provide the necessary amount of liquid-phase for LPS—a thick WC layer will still be present to protect the "soluble core" group particles from attack by cobalt. It should be possible to increase the temperature as high as required to get any additional liquid phase ("lubricant+interstitial filler+capillary attractor material") needed for full density with minimal concern about grain growth.

For example, in one embodiment, such as a 1 micron core TCHP, TiN particle, with the WC and TiN v % being equal, the initial WC coating (spherical model) will be almost 129 nm thick, and will comprise about 75 wt % of the total particle. Dissolution of the WC at 1500° C. will remove only 7.9 nm, or about 6% of the coating thickness, leaving about 121 nm, or about 94% of the original coating thickness for core particle protection, inter-core particle distance uniformity, and structural toughness.

Because of this feature of TCHP, increasing the amount of binder phase solvent present, by for example, increasing the cobalt layer thickness is another feasible sintering method that can be used according to the methods described herein. For example, increasing cobalt weight percentages higher than are customary in WC—Co sintering become feasible as a means of providing the needed dissolution, capillarity, WC kinetics, and densification for TCHP. It is to be remembered that in TCHP, the WC is primarily present as a tough matrix material because the real wear resistance is being provided by the core particles. Added cobalt will therefore add to the amount of liquid phase during sintering while at the same time increasing fracture toughness after cooling.

Sintering may occur in a process chosen from sintering press, vacuum, powder injection molding, plastified extrusion, hot press, hot isostatic press (HIP), sinter-HIP, sintering furnace, laser cladding process, plasma cladding, high velocity oxygen-fueled (HVOF), spark plasma sintering, pressure plasma sintering, pressure-transmission medium, dynamic/explosive compaction, sinter forge, rapid prototyping, electron beam, and electric arc.

Figure 2:
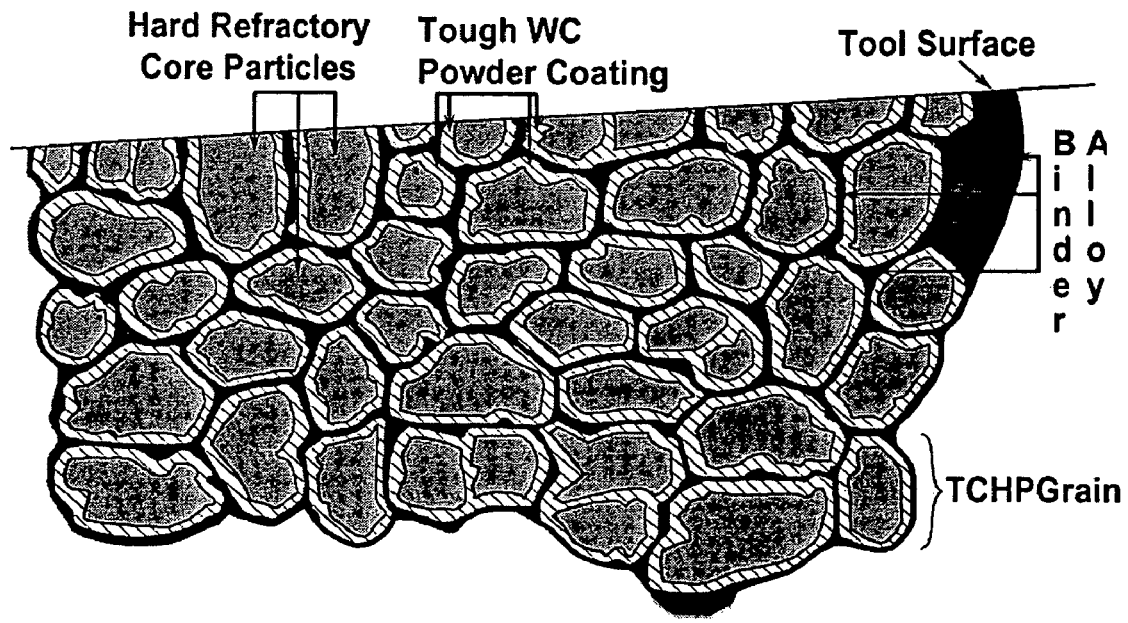
FIG. 2 represents a typical TCHP sintered article.

In TCHP, the WC coating protects the core particles. First, during sintering, especially in the "soluble core" group, the WC coating can protect the core particles from dissolution by the binder metal and can also protect the matrix from harmful pollution such as, for example, by TiN, ZrN, NbC. During use, the highly wear resistant TCHP core particles can protect the WC—Co support matrix from wear after sintering while the support matrix protects the brittle phases from fracture and pullout. FIG. 2 depicts the sintered microstructure of a typical TCHP material.

The TCHP structure with small hard core particle size and tough, nanoscale shells separated by thin cobalt ligaments below one micrometer between grains, improves, for example, elasticity, hardness, fracture toughness, and strength. In one non-limiting embodiment, even with a low hardness material (such as cobalt) the image stresses from dislocations near the surface (and all are near surfaces with submicrometer grains), the composite properties are higher than possible in abrasive composites.

According to the methods described herein, TCHP provides sinterable metal particulate materials that can be engineered to afford an optimum balance of properties, such as, for example, toughness, strength, low frictional coefficient, and hardness. In one non-limiting embodiment, operating improvements that can be observed in dies and other tooling fabricated from TCHP's are, for example: (a) a lower friction coefficient at the interface between the work piece and tool, yielding reduced heat, wear, and cratering, and requiring less processing power and auxiliary use of external lubricants, ultimately resulting in longer tool life and better process control; (b) a low reactivity with iron, reducing sticking and diffusion, flank, or die wear, and in turn extending the service life of the drawing die; and (c) a sintered tool microstructure in which the tough, strong coating material (e.g., WC) on the particles forms a cellular support macrostructure for the tool while, at the same time, providing a surface conforming and tightly-bound protective layer for the hard particulate cores (of, for example, TiN), holding them in position and permitting optimal exposure and hard phase retention at the wear-resistant tool surface. This is in contrast to articles produced by conventional methods wherein Ti—Co—WC alloying drastically lowers binder strength that exists between the particles and the binder itself lowers the level of toughness and bending strength, or in which a sintered article is wholly coated to impart hardness, wherein the thin coating has limited life or cracks.

Placing the hard-phase alloys inside, as the core particle instead of at the outside, distributes hard-phase alloys (exposed at the external surfaces after finish grinding) throughout the sintered microstructure in much greater proportions or thicknesses than is possible in any known conventional material. This in itself can, for example, increase wear resistance, reduce chemical interaction with the work piece, and lower coefficient of friction significantly. Tool life may be enhanced by the constant renewal of surface grains that wear or are pulled away by the opposing sliding surface.

Also, the wear resistance and adhesion characteristics of many of the possible core materials are known from their performance in conventional materials, so their performance as core particle materials is, in light of the present disclosure, predictable. Since, in certain non-limiting embodiments, the core particles are coated with known materials (e.g., WC) blending and sintering together coated particles having several different core materials will facilitate enhancement of multiple characteristics. Accordingly, the cost of development and testing are reduced while providing a final material with unique properties. Thus, designing a sintered microstructure where each particle has a tough shell (the intermediate layer) that can adhere very strongly to its neighbor particles to form a tough cellular support system throughout the sintered article substrate, produces a sintered article with a high combination of strength, high elastic modulus, fracture toughness, and hard alloy content.

In certain embodiments, resultant article macrostructure is a cellular microstructure framework composed of tough, strong, tightly interbonded coated particle shells, each containing and supporting at least one material chosen from mechanically and chemically-bonded core particles, crystals, fibers, and whiskers, exposed in cross-section at the external surfaces during finish grinding and polishing. This principle of optimizing the combination of different materials for the core particles and the surrounding intermediate layer allows the combination of normally conflicting article performance characteristics, such as, for example, strength and hardness, at levels not achievable with conventional materials.

This concept can give a material designer multiple tools that may be used singly or in combination and a straightforward method providing easy and total control in adapting the TCHP particle structure (intermediate layer thickness, size, and core materials) and mix (integrating different powders into tool and article zones) to meet many different unique, combined, and specialty demand conditions with a single article or tool.

Moreover, using a standard strong material (such as WC, for example) as a tough outer particle shell dramatically reduces the research, development and industrialization effort because only one material reaction precursor gas (for example, tungsten carbide) will have to be used to coat the powder particles, instead of the many dozens of complicated precursor and reactant gases used in multiple external substrate coatings. Such particulate materials will sinter as if made of tungsten carbide particles, for example, which are already known to bond very strongly to neighboring tungsten carbide particles with a binder such as cobalt. The tungsten carbide coating thickness on the particle may be increased, for example, to meet more challenging strength applications or may be decreased, for example, in more critical wear applications to solve most design challenges. For instance, the core particle size can readily be increased to meet more severe requirements for wear resistance or decreased for higher strength applications. Using different core particle materials with characteristics such as, for example, hardness and coefficient of friction, known or found to perform better in specific applications, such as, for example, for flank wear or crater wear, may also be accomplished by selection of the core material. It is also possible to blend the above thickness, diameter, and core material powder parameters to solve most multiple criteria applications.

Articles made from TCHP particles combine the best mechanical properties of strength, hardness, high elastic modulus, fracture toughness, low interaction with the work piece, and low coefficient of friction that exist separately in conventional materials into an article of unmatched combined properties. TCHPs have virtually unlimited uses in the manufacture, surface modification, or repair of components, assemblies, and machines. One component group includes cutting, forming, grinding, measuring, petroleum, and mining and construction tools. Nontool components include biomedical, military, electronic, sports, thermal management, and cosmetic applications. Extensive industrial applications will be found in the agricultural, civil, lumber and paper, petrochemical, rubber and plastic, transportation, aircraft/ aerospace, maritime, architectural, and energy sectors. Thus this material is well-suited for use in a broad array of articles including, for example:

tooling, such as wire drawing dies, extrusion dies, forging dies, cutting and stamping dies, forms, forming rollers, injection molds, shears, drills, milling and lathe cutters, saws, hobs, broaches, reamers, taps and dies;

individual mechanical parts, such as gears, cams, journals, nozzles, seals, valve seats, pump impellers, capstans, sheaves, bearing and wear surfaces;

integrated co-sintered components to replace mating parts internal combustion engine connecting rods, bearings and/or to provide hard surface zones in powdered metal (P/M) mechanical parts substituted for forged or machined steel parts with heat treated zones, such as camshafts, transmission parts, printer/copier parts;

heavy industrial articles such as deep well drilling bits, teeth for mining and earthmoving equipment, hot rolls for steel mills; and electromechanical components such as memory drive reading heads, specialized magnets.

The fact that consolidated TCHP articles are macroscopically homogeneous, rather than externally coated, can offer users or suppliers the opportunity of economically regrinding and reusing the initially worn articles. This is especially important for tools such as wire drawing dies, twist drills, milling cutters, and water jet nozzles.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Unless otherwise indicated, all numbers expressing quantities of ingredients, reaction conditions, and so forth used in the specification and claims are to be understood as being modified in all instances by the term "about," which intended to mean +/−5% of the number expressed. Accordingly, unless indicated to the contrary, the numerical parameters set forth in the following specification and attached claims are approximations that may vary depending upon the desired properties sought to be obtained by the present invention.

What is claimed is:

1. A method of forming an article, said method comprising:
providing a plurality of core particles comprised of one core particle material, or a plurality of different core particle materials, said core particle material being selected from the group consisting of: metal and metalloid nitrides, metal and metalloid carbides, metal and metalloid carbonitrides, metal and metalloid borides, metal and metalloid oxides, metal and metalloid sulfides, metal and metalloid silicides, and diamond;
applying an intermediate layer on a majority of said core particles by depositing atoms on the surface of the core particles in an amount ranging of from 10% to 80% by weight of said article, said intermediate layer comprising a second compound, different in composition from said core particle material and having a higher relative fracture toughness, said second compound being capable of bonding with said core particle material and being capable of bonding with a metal selected from the group consisting of: iron, cobalt, nickel, copper, titanium, aluminum, magnesium, lithium, beryllium, silver, gold, platinum and their mixtures, thereby forming coated particles;
applying an outer layer to said coated particles by depositing atoms on the outer surface of said intermediate layer, wherein said atoms comprise a metal selected from the group consisting of: iron, cobalt, nickel, and their mixtures to form a substantially continuous outer layer on said intermediate layer, thereby forming component particles;
shaping a plurality of said component particles into an article;
sintering said article at a temperature sufficient to liquefy at least a portion of said outer layer, and for a time sufficient to dissolve a portion of said intermediate layer in the liquid formed from said outer layer to provide an effective amount of liquid to achieve substantially full density, wherein the sintering temperature ranges from 600° C. to 1700° C. and the amount of liquid phase comprised of the outer layer, the intermediate layer, or both is in the range of from 6 to 44% by volume of the volume of component particles, not including the core particle volume, and wherein said sintering leaves a portion of said intermediate layer undissolved; and
solidifying liquids formed from said outer layer and said intermediate layer such that said atoms deposited to form said intermediate layer re-precipitate into a matrix outside said undissolved portion of the intermediate layer, wherein said matrix comprises discrete crystals of said intermediate layer in a binder of said outer layer, wherein said liquids formed from said outer layer and said intermediate layer are solidified prior to chemical interaction of the liquids with the core particles.

2. The method of claim 1, said core particle material having the formula $M_aX_b$, where M is a metal selected from the group consisting of: titanium, zirconium, hafnium, vanadium, niobium, tantalum, chromium, molybdenum, tungsten, aluminum, magnesium, copper, and silicon; X is an element chosen from nitrogen, carbon, boron, sulfur, and oxygen; and a and b are numbers greater than zero up to and including fourteen.

3. The method of claim 1, said core particle material being selected from the group consisting of: TiN, TiCN, TiC, $TiB_2$, ZrC, ZrN, $ZrB_2$, HfC, HfN, $HfB_2$, $TaB_2$, VC, VN, cBN, hBN, $Al_2O_3$, $Si_3N_4$, $SiB_6$, SiAlCB, $B_4C$, $B_2O_3$, $W_2B_5$, $WB_2$, $WS_2$, AlN, $AlMgB_{14}$, $MoS_2$, $MoSi_2$, $Mo_2B_5$, $MoB_2$, and mixtures thereof.

4. The method of claims 1, 2, or 3, wherein said sintering temperature and time do not result in complete dissolution of said intermediate layer.

5. The method of claims 1, 2, or 3, wherein said sintering temperature and time result in 5-50% dissolution of said intermediate layer.

6. The method of claims 1, 2, or 3, wherein said sintering temperature and time result in 50-99% dissolution of said intermediate layer.

7. The method of claims 1, 2 or 3, wherein a solid portion of said intermediate layer prevents chemical interaction of said liquid with said core particles.

8. The method of claims 1, 2 or 3, wherein said intermediate layer comprises a material selected from the group consisting of: WC, $W_2C$, tool steel, glassy and devitrified nanosteel alloys, silicon nitride, and tantalum carbide.

9. The method of claims 1, 2 or 3, wherein said intermediate layer comprises a material selected from WC, TaC, $W_2C$, WC and $W_2C$ in an amount in the range of from 60% to 98% by weight of said article.

10. The method of claims 1, 2 or 3, wherein said intermediate layer comprises a material selected from the group consisting of: WC, TaC, $W_2C$, WC and $W_2C$ in an amount in the range of from 10% to 60% by weight of said article.

11. The method of claims 1, 2 or 3, wherein said intermediate layer comprises a material selected from the group consisting of: WC, TaC, $W_2C$, WC and $W_2C$ in an amount in the range of from 5% to 10% by weight of said article.

12. A method of forming an article, said method comprising:
provided a plurality of core particles comprised of one core particle material, or a plurality of different core particle materials, said core particle material being selected from the group consisting of: TiN, TiCN, TiC, $TiB_2$, ZrC, ZrN, $ZrB_2$, HfC, HfN, $HfB_2$, $TaB_2$, VC, VN, cBN, hBN, $Al_2O_3$, $Si_3N_4$, $SiB_6$, SiAlCB, $B_4C$, $B_2O_3$, $W_2B_5$, $WB_2$, $WS_2$, AlN, $AlMgB_{14}$, $MoS_2$, $MoSi_2$, $Mo_2B_5$, $MoB_2$, and diamond;
applying an intermediate layer on a majority of said core particles by depositing atoms on the surface of the core particles in an amount in the range of from 10% to 80% by weight of said article, said intermediate layer comprising a second compound, different in composition from said core particle material and having a higher relative fracture toughness, said second compound being selected from the group consisting of: WC, TaC, $W_2C$, and a mixture of WC and $W_2C$, thereby forming coated particles;
applying an outer layer to said coated particles by depositing atoms of a metal selected from the group consisting of: iron, cobalt, nickel, and their mixtures to form a substantially continuous outer layer on said intermediate layer, thereby forming component particles;
shaping a plurality of said component particles into an article;
sintering said article at a temperature sufficient to liquefy at least a portion of said outer layer, and for a time sufficient to dissolve from 5 to 90 volume % of said intermediate layer in the liquid formed from said outer layer to provide an effective amount of liquid to achieve substantially full density, wherein the sintering temperature ranges from 600° C. to 1700° C. and the amount of liquid phase comprised of the outer layer, the intermediate layer, or both is in the range of from 6 to 44% by volume of the volume of component particles, not including the core particle volume, and wherein said sintering leaves a portion of said intermediate layer undissolved; and
solidifying liquids formed from said outer layer and said intermediate layer such that said atoms deposited to form said intermediate layer re-precipitate into a matrix outside said undissolved portion of the intermediate layer, wherein said matrix comprises discrete crystals of said intermediate layer in a binder of said outer layer, wherein said liquids formed from said outer layer and said intermediate layer are solidified prior to chemical interaction of the liquids with the core particles.

13. The method of claims 1, 2, 3 or 12, wherein said coated particles have an average particle size less than about 1000 microns.

14. The method of claims 1, 2, 3 or 12, wherein said coated particles have an average particle size less than about 100 microns.

15. The method of claims 1, 2, 3 or 12, wherein said coated particles have an average particle size less than about 50 microns.

16. The method of claims 1, 2, 3 or 12, wherein said coated particles have an average particle size less than about 2 microns.

17. The method of claims 1, 2, 3 or 12, wherein said coated particles have an average particle size less than about 1 micron.

18. The method of claims 1, 2, 3 or 12, wherein said coated particles have an average particle size in the range of 100-1000 nanometers.

19. The method of claims 1, 2, 3 or 12, wherein said intermediate layer has a thickness, after sintering, in the range of from 5% to 50% of the diameter of said core particles.

20. The method of claims 1, 2, 3 or 12, wherein said outer layer has a thickness after sintering in the range of from 3% to 12% of the diameter of said coated particles.

21. The method of claims 1, 2, 3 or 12, wherein said outer layer further comprises one or more layers of material selected from the group consisting of: metal, ceramic, binder, sintering aid, and polymeric material.

22. The method of claims 1, 2, 3 or 12, wherein said intermediate layer is deposited by at least one method selected from chemical vapor deposition, physical vapor deposition, plasma deposition, laser cladding or deposition process, plasma cladding, magnetic plasma deposition, electrochemical plating, electroless plating, sputtering, solid phase synthesis, solution chemistry deposition processes and combinations of such processes.

23. The method of claims 1, 2, 3 or 12, wherein said outer layer is deposited by at least one method selected from chemical vapor deposition, physical vapor deposition, plasma deposition, laser cladding or deposition process, plasma cladding, magnetic plasma deposition, electrochemical, electroless, sputtering, solid phase synthesis, and solution chemistry deposition process.

24. The method of claims 1, 2, 3 or 12, wherein said intermediate layer is deposited at a temperature in the range of from 125° C. to 1800° C.

25. The method of claims 1, 2, 3 or 12, wherein said intermediate layer is deposited at a temperature in the range of from 20° C. to 125° C.

26. The method of claims 1, 2, 3 or 12, wherein said intermediate layer is deposited at a temperature in the range of from 1800° C. to 8000° C.

27. The method of claims 1, 2, 3 or 12, wherein said intermediate layer is deposited at a temperature in the range of from 200° C. to 800° C.

28. The method of claims 1, 2, 3 or 12, wherein said outer layer is deposited at a temperature in the range of from 20° C. to 125° C.

29. The method of claims 1, 2, 3 or 12, wherein said outer layer is deposited at a temperature in the range of from 125° C. to 650° C.

30. The method of claims 1, 2, 3 or 12, wherein said outer layer is deposited at a temperature in the range of from 200° C. to 550° C.

31. The method of claims 1, 2, 3 or 12, wherein said sintering temperature is in the range of from 600° C. to 1275° C.

32. The method of claims 1, 2, 3 or 12, wherein said outer layer comprises an amount in the range of from 0.5% to 3% by weight of said article.

33. The method of claims 1, 2, 3 or 12, wherein said outer layer comprises an amount in the range of from 3% to 18% by weight of said article.

34. The method of claims 1, 2, 3 or 12, wherein said outer layer comprises an amount in the range of from 18% to 45% by weight of said article.

35. The method of claims 1, 2, 3 or 12, wherein sintering consolidation occurs primarily from capillary forces.

36. The method of claims 1, 2, 3 or 12, wherein the volume of the liquid phase is increased by increasing at least one parameter chosen from sintering temperature and cobalt content.

37. The method of claim 36, wherein said process gases are provided in the range from zero absolute pressure to atmospheric pressure.

38. The method of claims 1, 2, 3 or 12, wherein consolidation occurs in a gas atmosphere selected from nitrogen, argon, helium, hydrogen, neon, krypton, xenon, methane, acetylene, carbon monoxide, carbon dioxide, and their mixtures and compounds.

39. The method of claims 1, 2, 3 or 12, further comprising mixing at least one additive chosen from paraffin waxes, stearic acid, ethylene bis-stearamide (EBS), polyvinyl alcohol and polyethylene glycol, with a plurality of said component particles prior to or simultaneous with said shaping.

40. The method of claims 1, 2, 3 or 12, wherein said sintering temperature ranges from greater than 1275° C. to 1700° C.

41. The method of claim 1, wherein said sintering temperature is greater than 1315° C.

42. The method of claim 1, wherein said sintering temperature is greater than 1400° C.

43. The method of claim 1, wherein said sintering temperature is greater than 1500° C.

44. A method of forming an article, said method comprising:

providing a plurality of core particles comprised of one core particle material, or a plurality of different core particle materials, said core particle material being selected from the group consisting of: TiN, TiCN, TiC, $TiB_2$, ZrC, ZrN, $ZrB_2$, HfC, HfN, $HfB_2$, $TaB_2$, VC, VN, cBN, hBN, $Al_2O_3$, $Si_3N_4$, $SiB_6$, SiAlCB, $B_4C$, $B_2O_3$, $W_2B_5$, $WB_2$, $WS_2$, AlN, $AlMgB_{14}$, $MoS_2$, $MoSi_2$, $Mo_2B_5$, $MoB_2$ and diamond;

applying an intermediate layer on a majority of said core particles by depositing atoms on the surface of the core particles in an amount ranging from 10% to 80% by weight of said article, said intermediate layer comprising a second compound, different in composition from said core particle material and having a higher relative fracture toughness, said second compound being selected from the group consisting of: WC, TaC, $W_2C$, and a mixture of WC and $W_2C$, thereby forming coated particles;

applying an outer layer to said coated particles by depositing atoms of a metal selected from the group consisting of: iron, cobalt, nickel, and their mixtures to form a substantially continuous outer layer on said intermediate layer, thereby forming component particles;

shaping a plurality of said component particles into an article;

sintering said article at a temperature sufficient to liquefy at least a portion of said outer layer, and for a time sufficient to dissolve from 5 to 90 volume % of said intermediate layer in the liquid formed from said outer layer to provide an effective amount of liquid to achieve substantially full density, wherein the sintering temperature ranges from 1700° C. to 8000° C. and wherein said sintering leaves a portion of said intermediate layer undissolved; and solidifying liquids formed from said outer layer and said intermediate layer such that said atoms deposited to form said intermediate layer re-precipitate into a matrix outside said undissolved portion of the intermediate layer, wherein said matrix comprises discrete crystals of said intermediate layer in a binder of said outer layer, wherein said liquids formed from said outer layer and said intermediate layer are solidified prior to chemical interaction of the liquids with the core particles.

* * * * *